US008808077B1

(12) United States Patent
Chun

(10) Patent No.: US 8,808,077 B1

(45) Date of Patent: Aug. 19, 2014

(54) TABLE GAME TOURNAMENTS USING PORTABLE DEVICES

(71) Applicant: Novel Tech International Limited, Hong Kong (HK)

(72) Inventor: Jay Chun, Hong Kong (HK)

(73) Assignee: Novel Tech International Limited, Hong Kong (HK)

( * ) Notice: Subject to any disclaimer, the term of this patent is extended or adjusted under 35 U.S.C. 154(b) by 0 days.

(21) Appl. No.: 14/017,073

(22) Filed: Sep. 3, 2013

(51) Int. Cl.

| | |
|---|---|
| ***A63F 9/24*** | (2006.01) |
| ***A63F 13/00*** | (2014.01) |
| ***G07F 17/32*** | (2006.01) |

(52) U.S. Cl.

CPC .................................. *G07F 17/3293* (2013.01)

USPC .................................. 463/11; 463/25; 463/42

(58) Field of Classification Search

USPC .......................................... 463/11-13, 42, 46

See application file for complete search history.

(56) References Cited

U.S. PATENT DOCUMENTS

| | | | | |
|---|---|---|---|---|
| 5,083,271 | A * | 1/1992 | Thacher et al. | 700/92 |
| 5,472,194 | A | 12/1995 | Breeding et al. | |
| 5,605,334 | A * | 2/1997 | McCrea, Jr. | 273/309 |
| 5,768,382 | A * | 6/1998 | Schneier et al. | 380/251 |
| 5,851,011 | A * | 12/1998 | Lott | 273/292 |
| 5,917,725 | A * | 6/1999 | Thacher et al. | 700/91 |
| 5,970,143 | A * | 10/1999 | Schneier et al. | 713/181 |
| 6,165,069 | A * | 12/2000 | Sines et al. | 463/12 |
| 6,331,148 | B1 | 12/2001 | Krause | |
| 6,508,709 | B1 * | 1/2003 | Karmarkar | 463/42 |
| 6,671,358 | B1 * | 12/2003 | Seidman et al. | 379/93.12 |
| 6,991,544 | B2 * | 1/2006 | Soltys et al. | 463/42 |
| 7,008,322 | B1 * | 3/2006 | Suzuki et al. | 463/31 |
| 7,040,982 | B1 | 5/2006 | Jarvis | |
| 7,206,762 | B2 | 4/2007 | Sireau | |
| 7,233,922 | B2 | 6/2007 | Asher | |
| 7,566,268 | B2 | 7/2009 | Asher | |
| 7,566,270 | B2 | 7/2009 | Amaitis | |
| 7,604,537 | B2 | 10/2009 | Amaitis | |
| 7,637,506 | B2 * | 12/2009 | Naicker | 273/292 |
| 7,684,874 | B2 | 3/2010 | Schlottmann et al. | |
| 7,690,996 | B2 * | 4/2010 | Iddings et al. | 463/42 |
| 7,711,628 | B2 | 5/2010 | Davie | |
| 7,727,060 | B2 * | 6/2010 | Mills | 463/13 |
| 7,731,586 | B2 * | 6/2010 | Letovsky et al. | 463/20 |
| 7,783,542 | B2 | 8/2010 | Horowitz | |

(Continued)

OTHER PUBLICATIONS

Office Action for U.S. Appl. No. 13/948,101, mailed Dec. 16, 2013.

(Continued)

*Primary Examiner* — Steven J Hylinski

(57) ABSTRACT

Table game tournament systems can include player terminal(s), electronic gaming table(s), and/or a remote server. A player terminal can have an outer housing, a controller located therewithin or thereabout, input and output component(s), and a communications interface to an outside gaming network having other functionally similar gaming device(s), gaming table(s), and a remote server. The controller and/or server can facilitate providing tournament information to a player, which information can include whether the player would qualify for the next tournament round, who is the most serious opponent to the player, and/or the chip difference therebetween. A terminal can also facilitate asynchronous and individually paced tournament play, switching between different tournament tables on demand, and play of other non-tournament table games thereat simultaneously with the play of the table game tournament. Portable computing devices can be used as player terminals and can permit players to play in actual or practice play-along modes.

17 Claims, 7 Drawing Sheets

(56) References Cited

U.S. PATENT DOCUMENTS 7,783,552 B2 8/2010 Assia
7,798,895 B2 9/2010 Jubinville et al.
8,052,526 B2 * 11/2011 Abbott et al. .................. 463/29
8,070,583 B2 12/2011 Baerlocher et al.
8,282,489 B2 * 10/2012 Arezina et al. .................. 463/42
8,469,788 B2 6/2013 Carpenter et al.
2002/0094869 A1 * 7/2002 Harkham ........................ 463/42
2002/0147042 A1 10/2002 Shinners et al.
2002/0151366 A1 10/2002 Walker et al.
2003/0137110 A1 7/2003 Huard et al.
2003/0195841 A1 10/2003 Ginsberg
2004/0204232 A1 10/2004 Asher
2005/0043094 A1 * 2/2005 Nguyen et al. .................. 463/42
2005/0165669 A1 7/2005 Montanaro
2005/0197938 A1 9/2005 Davie
2005/0197948 A1 9/2005 Davie
2006/0058082 A1 * 3/2006 Crawford et al. ................. 463/7
2006/0058083 A1 * 3/2006 Crawford et al. ............... 463/11
2006/0058084 A1 * 3/2006 Crawford et al. ............... 463/11
2006/0058085 A1 * 3/2006 White et al. .................... 463/11
2006/0058086 A1 * 3/2006 White et al. .................... 463/11
2006/0058087 A1 * 3/2006 White et al. .................... 463/11
2006/0058088 A1 * 3/2006 Crawford et al. ............... 463/13
2006/0058089 A1 * 3/2006 White et al. .................... 463/13
2006/0058090 A1 * 3/2006 Crawford et al. ............... 463/13
2006/0058091 A1 * 3/2006 Crawford et al. ............... 463/13
2006/0058092 A1 * 3/2006 Crawford et al. ............... 463/13
2006/0058093 A1 * 3/2006 White et al. .................... 463/13
2006/0066052 A1 * 3/2006 White et al. .................. 273/309
2006/0068498 A1 * 3/2006 White et al. .................... 436/17
2006/0068864 A1 * 3/2006 White et al. .................... 463/13
2006/0068865 A1 * 3/2006 White et al. .................... 463/13
2006/0068866 A1 * 3/2006 White et al. .................... 463/13
2006/0068868 A1 * 3/2006 Crawford et al. ............... 463/13
2006/0068869 A1 * 3/2006 White et al. .................... 463/13
2006/0068870 A1 * 3/2006 Crawford et al. ............... 463/13
2006/0068871 A1 * 3/2006 Crawford et al. ............... 463/13
2006/0068879 A1 * 3/2006 Crawford et al. ............... 463/17
2006/0068899 A1 * 3/2006 White et al. .................... 463/25
2006/0100019 A1 5/2006 Hornik et al.
2006/0105839 A1 5/2006 Graeve
2006/0217199 A1 * 9/2006 Adcox et al. .................... 463/40
2006/0264252 A1 * 11/2006 White et al. .................... 463/13
2006/0287066 A1 * 12/2006 Crawford et al. ............... 463/25
2006/0287067 A1 * 12/2006 White et al. .................... 463/25
2006/0287101 A1 * 12/2006 Crawford et al. ............... 463/42
2006/0287102 A1 * 12/2006 White et al. .................... 463/42
2006/0287103 A1 * 12/2006 Crawford et al. ............... 463/42
2006/0287104 A1 * 12/2006 White et al. .................... 463/42
2007/0015583 A1 * 1/2007 Tran ............................... 463/40
2007/0129138 A1 6/2007 Amaitis
2007/0178955 A1 * 8/2007 Mills .............................. 463/13
2007/0259709 A1 11/2007 Kelly et al.
2008/0045344 A1 2/2008 Schlottmann et al.
2008/0081685 A1 4/2008 Naftaly
2008/0108404 A1 * 5/2008 Iddings et al. .................. 463/16
2008/0113767 A1 5/2008 Nguyen et al.
2008/0200242 A1 8/2008 Ginsberg
2008/0248849 A1 10/2008 Lutnick et al.
2009/0131151 A1 * 5/2009 Harris et al. .................... 463/22
2009/0280904 A1 * 11/2009 Nicely et al. .................... 463/40
2011/0294561 A1 * 12/2011 Shaw et al. ..................... 463/20
2012/0083909 A1 4/2012 Carpenter et al.
2012/0329551 A1 * 12/2012 Arezina et al. .................. 463/25
2013/0116031 A1 5/2013 Carpenter et al.
2013/0225276 A1 8/2013 Au-Yeung
2013/0244765 A1 * 9/2013 Arnone et al. .................. 463/25
2013/0281197 A1 10/2013 Carpenter et al.
2013/0288764 A1 10/2013 Chun
2013/0288779 A1 10/2013 Chun
2013/0296031 A1 * 11/2013 Arnone et al. .................. 463/25

OTHER PUBLICATIONS

Cantor Fitzgerald Hopes to Bring Spread Betting to Las Vegas Casinos, Dec. 14, 2009.
Finanical Spread Betting, Apr. 26, 2012.
High-Speed Traders Set Their Sights on Asia and Latin America, Aug. 12, 2010.
Office Action for U.S. Appl. No. 13/456,110, mailed Jun. 11, 2013.
Final Office Action for U.S. Appl. No. 13/456,110, mailed Dec. 24, 2013.
Office Action for U.S. Appl. No. 14/017,071, mailed Nov. 7, 2013.
Notice of Allowance for U.S. Appl. No. 14/017,071, mailed Jan. 24, 2014.

* cited by examiner

TABLE GAME TOURNAMENTS USING PORTABLE DEVICES

TECHNICAL FIELD

The present invention relates generally to gaming machines, tables and systems, and more particularly to gaming tables having automated components.

BACKGROUND

Wagering games such as baccarat, blackjack, roulette, craps, sic-bo, and various poker-based table games, among many others, are popular games offered in casinos and other similar establishments. These games are generally administered by human dealers and are played on physical gaming tables having a dealer surface, felt or similar table top layouts, cards, dice, chips and the like, or they can be played on electronic gaming machines where the dealer, playing cards, chips or other gaming elements may be virtual.

While many formats for these table games involve live cash type games against the house or other players, where players can come or go at any time as they please, there are also many types of tournament style formats as well. As is generally well known, a casino game type tournament can involve multiple players registering for the tournament, paying a registration fee or buy-in amount, playing numerous hands or plays of the particular table game or games against each other, accumulating a tournament score or chips total over those games, and then winning a cash amount and/or other prize for placing well in the tournament.

As a particular example, many baccarat tournaments are of the buy-in type. Players pay an entry fee and register to compete for the collected pool of money or prizes, less the costs of the casino or other host establishment running the tourney. The buy-ins can entitle the players to a number of chips, and all players typically start with the same number of chips. The players then compete over a given number of deals or hands, or alternatively over a set period of time, either of which constitutes a tournament round. The player (or players) with the highest number of chips or balance at the end of the round is the winner(s). It is not necessary that the winner have more chips or balance than he or she started with. He or she merely has to have more chips or balance than the other players. Hence, in baccarat tournaments a player can lose all hands over a given later round and yet still win the tournament. Many tournaments are of the progressive type. The first round is played over many tables, and the winner or winner at each table move(s) on to the next round. This procedure typically continues till the final round, the winner of which is the winner of the whole tournament.

Although baccarat is a game of luck, baccarat tournament strategy is more complex. In fact, the aim for baccarat and many other table game tournaments is to manage your bankroll. Each player has to play his or her best against the bank, but at the same time he or she has to keep track of the chip position of other players. There are different strategies that are prevalent in the baccarat tournament circuit, which strategies can also apply to other table game type tournaments.

One strategy starts with minimal wagering. Towards the end of the round the player assesses the difference between himself or herself and the leader. He or she then uses the conserved bankroll to place large wagers and overtake the leader. The rationale is that once the target is known it is then easier to chart the course. Another strategy is based on the assumption that it is next to impossible to catch up. This strategy advocates aggressive wagering early on so that a lead is immediately established. Thereafter, a period of minimal betting follows till a competitor catches up. The player may again have to resort to aggressive betting to keep the competitor(s) at bay. Many players believe that luck comes in streaks. So yet another strategy is to place large wagers during a winning streak and small wagers during losing streaks. Because of the various options available to players, both number of hands and time based tournaments are very popular.

Unfortunately, there are several inherent restrictions or limitations to many forms to table game tournaments. For one thing, such tournaments often require players to be present and playing at exact dates and times. This can often prove to be inconvenient to many players who would otherwise be interested in playing in a particular tournament but cannot make the exact date and time given. As another limitation, it is often difficult to obtain crucial information about the tournament in real time, which information would be useful to many savvy players. For example, the exact chip stack or score of other players would often be useful data to a shrewd tournament player, but such information can be hard to determine visually at times. While often legal, it can be time consuming and annoying for a player to request a chip count or score of his or her fellow tournament competitors. Furthermore, such requests can sometimes be disallowed or impractical when there are many tables that are participating in the same table game tournament.

In addition to the foregoing concerns, it is often the case that new or inexperienced players may shy away from table game tournaments due to shyness, unfamiliarity, or a reluctance to risk a buy in or other monetary value or credit on a game or tournament that can be unfamiliar and intimidating. Typically there is no way for new players to assess whether a particular table game, a tournament for same, a format therefor, or other factors might be readily ascertained or learned, such that actual participation by a new and prospective player might be daunting. As such, the ability to generate more players and play in table game tournaments can be hindered by an inability to "learn" to play in such tournaments through any method but "trial by fire" where the player risks money just to learn.

While table game tournaments have worked well in practice over many years, there is always a desire improve the attractiveness and functionality of such tournaments and the gaming systems that support them. What is desired then are improved gaming terminals and gaming table systems, particularly with respect to those having the ability to improve the functionality and features for tournament style play on such terminals, tables and systems.

SUMMARY

It is an advantage of the present disclosure to provide improved gaming terminals and gaming table systems, particularly with respect to those having the ability to provide better table game tournaments and new features for same. This can be accomplished at least in part through the use of electronic gaming terminals, tables and systems adapted to provide individually paced table game tournaments that allow for asynchronous tournament play, easier access to tournament player data and stats, player abilities to switch tournament tables and/or play multiple tournament tables, and simultaneous tournament play and other live table game play, among other various features and options.

In various embodiments of the present disclosure, a gaming device adapted to facilitate the play of table games in a table game tournament format can include an outer housing, a controller located within or about the outer housing and adapted to facilitate the play of a table game tournament by a player thereat, one or more input components coupled to the controller and adapted to accept input from the player regarding the play of the table game tournament, one or more display components coupled to the controller and adapted to provide output to the player regarding the play of the table game tournament, and a communication interface coupled to the controller and adapted to facilitate communications between the controller and an outside gaming network. The outside gaming network can include a plurality of functionally similar gaming devices and one or more gaming tables that host table games for the table game tournament. Further, the controller can also be adapted to facilitate the provision of current tournament information to the player at the gaming device upon a demand from the player, continuously in automated fashion, or both.

In various detailed embodiments, the table game tournament can involve the game(s) of baccarat, blackjack, sic-bo, poker, roulette and/or craps, among others. The current tournament information can include a determination of whether the player would qualify for the next round of the table game tournament if a current round were to end at that time. Alternatively or in addition, the current tournament information can include a determination of the most serious opponent to the player. Further, such current tournament information can includes the score or chips held by the most serious opponent, the difference in score or chips between the player and the most serious opponent, or both.

In various detailed embodiments, which may be added to other detailed embodiments, the gaming device can be adapted to facilitate the play of other non-tournament table games thereat simultaneously with the play of the table game tournament. In such cases, the play of the other non-tournament table games can contribute to a score of the player for the table game tournament. Also, the gaming device can be adapted to permit the player to switch tournament play on demand from table games taking place on a first tournament gaming table in the outside network to a second tournament gaming table in the outside network. Further, the table game tournament can involve a minimum number of hands or plays, a minimum amount of playing time, a maximum number of hands or plays, a maximum amount of playing time, or any combination thereof.

In still further detailed embodiments, the gaming device or system can be adapted to permit the player to play in the table game tournament asynchronously with respect to other players also playing in the table game tournament. In some embodiments, the gaming device or system can be adapted to permit the player to stop playing in the table game tournament for a substantial period of time and to resume playing in the table game tournament at a later time. In some embodiments, the gaming device or system can permit the player to continue play in the table game tournament at one of the plurality of functionally similar gaming devices.

In other embodiments, a gaming table adapted to host a table game tournament involving one or more monetary awards can include a physical surface adapted for the play of a table game tournament that includes the use of one or more game components, a table controller adapted to control a plurality of gaming table functions, and a communication interface coupled to the table controller and adapted to facilitate communications between the table controller and an outside gaming network. The physical surface can be located proximate or near a plurality of associated player terminals, wherein each of the plurality of associated player terminals provides for the presence of a player to play said table game tournament and includes a player terminal processor coupled to a player interface having one or more player input and output devices. Alternatively, or in addition, some or all of the player terminals can be located remotely from the physical surface of the table. The table controller can be further adapted to facilitate the provision of current tournament information to a player at one of the plurality of player terminals upon a demand from the player, continuously in automated fashion, or both. Also, the outside gaming network can include at least the plurality of associated player terminals, one or more functionally similar gaming tables that host table games for the table game tournament, and/or a remote server. One or more of the foregoing details can also apply to the gaming table embodiments.

In still other embodiments, a gaming table system can include one or more electronic gaming tables adapted to conduct tournament table games involving wager based games, a plurality of player terminals in communication with each of the one or more electronic gaming tables, and a system server located remotely from and in communication with each of the one or more electronic gaming tables and plurality of player terminals. Each of the player terminals and electronic gaming tables can have some or all of the details such as those set forth above in other embodiments. Also, the system server can be adapted to facilitate the processing of transactions with respect to tournament table games played at the electronic gaming tables and at the player terminals. Again, some or all of the various detailed features set forth above can also apply to the overall system embodiments.

Other embodiments can include a gaming table system having one or more electronic gaming tables adapted to conduct tournament table games involving wager based games as well as a system server. The electronic gaming tables can include a physical surface adapted for the play of a table game that includes the use of one or more game components, a table controller adapted to control a plurality of gaming table functions, and a table communication interface coupled to the table controller and adapted to facilitate communications between the table controller and other components within the tournament table gaming system. Again, the table controller can be adapted to facilitate the provision of current tournament information. The system server can be located remotely from and in communication with the one or more electronic gaming tables, and can be adapted to facilitate the play of tournament table games administered at the electronic gaming table(s) by players using a plurality of separate portable electronic devices adapted to function as player terminals.

In various detailed embodiments, the system is adapted to permit player participation in a practice mode for an actual table game tournament, and such player participation in a practice mode can take place on one or more of the plurality of portable electronic devices. The practice mode can provides a player score and/or all tournament player terminal features to the practice player as if the practice player were actually playing in the tournament. The practice mode can also provide information to a practice player regarding how he or she would have fared if he or she had actually been playing in the tournament. Similar to the foregoing embodiments, the system can be adapted to facilitate on one or more of the plurality of portable electronic devices the play of other table games simultaneously with the play of the table game tournament, and can also be adapted to permit a player using one of the plurality of portable electronic devices to switch tournament play on demand from one electronic gaming table to another. Asynchronous tournament play can also be permitted on the portable device(s), which can be owned by the player(s) using the portable device(s).

In still further embodiments, a gaming table adapted to host a table game tournament involving one or more awards can include a physical surface adapted for the play of a table game tournament that includes the use of one or more game components, a table controller adapted to control a plurality of gaming table functions, wherein said table controller is further adapted to facilitate the provision of current tournament information to a player using a portable electronic device adapted to function as a player terminal, and a communication interface coupled to the table controller and adapted to facilitate communications between the table controller and an outside gaming network that includes at least one or more similar gaming tables that host table games for the table game tournament, a remotely located system server, or both. Details regarding such a gaming table can be the same or similar to details from any other embodiment set forth herein, such as the ability for asynchronous play, and features of the portable device as a player terminal.

In yet further embodiments, various methods of hosting table game tournaments can be provided. Such methods can include process steps such as providing one or more electronic gaming tables, coupling each of a plurality of player terminals to one or more of the electronic gaming tables, accepting registrations from a plurality of players for a table game tournament, administering a plurality of individual tournament table games at each of the one or more electronic gaming tables over the course of the tournament, allowing the plurality of players to participate in the plurality of individual tournament table games according to the choices of each player, wherein overall tournament play is asynchronous such that players are not required to play in every individual table game and players are not required to play concurrently with other players, and determining one or more winners at the end of the tournament according to the outcomes of all of the tournament table games, whenever such games were played. Such table game tournaments can therefore be self or individually paced.

Some embodiments can include various methods of facilitating player participation in a table game tournament using a portable computing device. Pertinent process steps can include providing a specialized software component to a portable computing device, the specialized software component being adapted to permit the portable computing device to function as a player terminal for a table game tournament, accepting a login from a player using the portable computing device, providing information specific to the table game tournament to the portable computing device, administering a plurality of table games for the table game tournament on one or more gaming tables, and permitting the player to participate in the plurality of table games for the table game tournament using the portable computing device. The overall tournament play can be asynchronous such that the player is not required to play in every individual table game and is not required to play concurrently with other players. Further, player participation can take place in a practice mode for the actual table game tournament. Additional steps can include determining how the player in practice mode performed during the tournament and providing this determination to the player.

In various detailed method embodiments, a further process step can include displaying current tournament information to a player upon a demand from the player, continuously in automated fashion, or both, such as where the current tournament information includes a determination of the most serious opponent to the player, the score or chips held by the most serious opponent, and/or the difference in score or chips between the player and the most serious opponent. Another process step can include facilitating the play of other table games simultaneously with the play of the table game tournament, such as at the same player terminal for the same player. Yet another process step can involve permitting a player to switch tournament play on demand from tournament table games taking place on a first electronic gaming table to a second electronic gaming table. Other details from the single table and system embodiments above can also apply to the various detailed method embodiments.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed inventive apparatuses, systems and methods for individually paced table game tournaments and other pertinent features of same and related tournament types. These drawings in no way limit any changes in form and detail that may be made to the disclosure by one skilled in the art without departing from the spirit and scope of the disclosure.

DETAILED DESCRIPTION

Figure 1A:
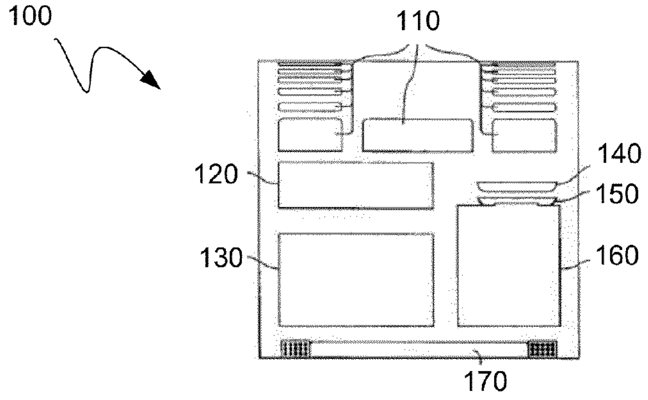
FIGS. 1A-1E illustrate in various views an exemplary electronic player terminal adapted for the play of individually paced table game tournaments according to one embodiment of the present disclosure.
Figure 1B:
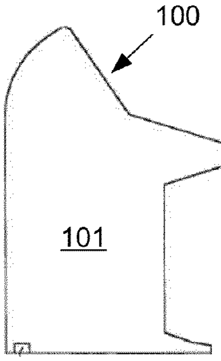
Figure 1C:
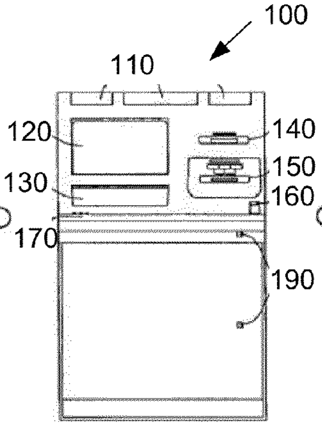
Figure 1D:
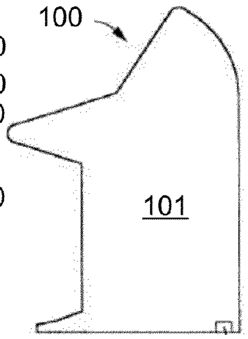
Figure 1E:
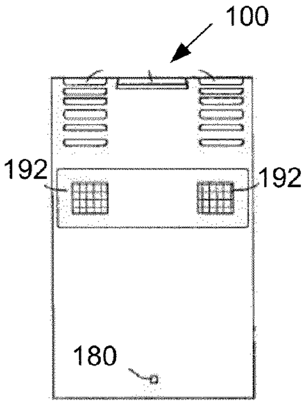

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to devices, systems and methods for providing, conducting and facilitating the play of wagering games at live electronic gaming tables that can include live dealers, live players, live gaming components, and an electronic platform. In various embodiments, such play can be conducted with respect to table game tournaments. As such, this disclosure may be applied to any live table game, such as baccarat, blackjack, roulette, craps, pai gow, sic bo, poker, bingo, keno, card games, and the like, as well as any other type of game having a live or electronic dealer, and/or one or more players seated at a gaming table or electronic gaming platform. In some embodiments, there may be no players actually seated at the physical gaming table itself, such that all players are playing at gaming terminals that are located apart from or even remotely from the actual physical surface of the gaming table. The various embodiments disclosed herein can be applied with respect to individual player terminals or other associated gaming devices, individual gaming tables, entire systems having both, and methods of running table games and table game tournaments.

This disclosure may also be applied in a live electronic gaming table system that monitors a live table game in which physical or virtual cards are dealt to one or more players at, near, or associated with a gaming table. Such live table games can be part of a table game tournament. Alternatively, or in addition, other physical gaming elements can be employed, such as dice, wheels, reels, cards, chips, tokens and the like. The game play data collected can be used to enable play of the same live table game remotely through gaming terminals. The gaming terminals may be any platform capable of receiving and transmitting data, including "thin-client" platforms or platforms which do not process game play data and "smart" platforms or platforms which process game play data. The gaming terminal may be stationary, similar to the slot machines or electronic tables commonly seen at the physical casino, or portable electronic devices such as smart phones, computer tablets, portable media players, laptop computers, desktop computers, smart TV, smart glasses, and the like. Additionally, the respective gaming network can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. Thus, players interested in placing wagers on a live table games or participating in an associated table game tournament are not confined to the gaming table or casino floor.

In general, the present disclosure can pertain to one player terminal, one electronic gaming table, a system of multiple player terminals and electronic gaming tables, and various methods using such components that allow for improved table game tournaments. In various embodiments, the player terminal, table and/or system allows remote player terminals to participate as if the remote player has a seat at the physical table. A relevant electronic gaming table system can include live electronic tables ("eTables"), remote game terminals (electronic gaming machine ("EGM"), smart phone, smart TV, tablet, desktop computer, etc.), a central games repository and server that acquires the available live games from each eTable, indexes them and broadcasts the games and games history to other electronic tables, remote game terminals, and remote gaming sites, a multi-site games traffic server that receives remote game requests, verifies a player's eligibility (location, ID, funds, player profile, play history), enforces jurisdictional rules, and routes eligible bets to the player's requested game "channel" being broadcast, a financial server that acts as a Central Clearinghouse for remote wagers, and a network that connects the electronic tables, remote game terminals, the games repository and router, and the financial clearinghouse server.

A table processor and/or remote server can be used to administer the game, track player decisions and decide game outcomes for each player accordingly. Other components and items may also be present as desired. In addition to the various components, details and other aspects set forth herein with respect to the disclosed player terminals, gaming table systems and remote gaming in general, further details and explanations regarding such player terminals, electronic gaming tables and remote table game systems can be found at, for example, U.S. Pat. Nos. 7,914,368; 7,918,723; 7,922,587; 8,182,321; 8,210,920; 8,308,559; and 8,323,105, as well as U.S. patent application Ser. Nos. 13/948,101; 13/893,340; 13/844,617; 13/542,446; 13/456,110; 13/042,633; and 11/198,218, with the entire contents of all of these patents and applications being incorporated herein by reference in their entireties and for all purposes.

Regarding the present disclosure, the foregoing systems and components can be used for administering table game tournaments. In some embodiments, this can involve the implementation of individually paced table game tournaments, such as that which is set forth in detail below. Although the various examples and illustrations herein are made primarily with respect to baccarat, it will be readily appreciated that numerous other table games and casino type games can also be similarly implemented. As such, the present disclosure can also be applied to, for example, blackjack, sic-bo, pai-gow, bingo, keno, poker, roulette and craps, among other possible casino games, as well as tournaments involving said game or games.

As will be readily appreciated, there can be useful information or data with respect to the play of tournaments in particular. One important thing for a player to do in a baccarat (or other table game type) tournament is to know where he or she stands in relation to other players in that round. The first question that he or she should ask is, "am I in a star position now?" Another way of asking the same question is, "if the round were to end this instant, would I make it through to the next round?" If the answer is yes, then the player is in a "star position" and the goal is to stay there. If the answer is no, then the player needs to catch up and must determine which other player or players he or she needs to overtake to reach a star position.

Another thing to do is to identify who is the "most serious opponent." In practice it often makes sense to focus on one "most serious opponent," although there is often more than one serious opponent to consider. If a player is in star position, his or her most serious opponent is typically the biggest chip stack (or score) who is not in a star position. In other words, the most serious opponent to a player in star position is the player most likely to rise into a star position and perhaps knock the current star position player out in the process. If a player is not in a star position, typically his or her most serious opponent is the smallest stack (or score) who is in a star position. In other words, the most serious opponent to a player not in star position is the player that he or she needs to get in front of to move into a star position. In practice, the "most serious opponent" often changes from hand to hand or play to play, and usually there is not just one most serious opponent, but several "most serious opponents." These "most serious opponents" in such cases will typically have similar stack sizes or scores. Skilled tournament players often refer to their opponents as "moving targets," and remember that they are targets that can only move a certain distance each hand or play, depending on their bet size for that hand.

Given the foregoing aspects and information that are particular to tournament play, it becomes useful for players to have this information at their fingertips before making a critical decision regarding tournament play. Often times, however, such information is difficult or impossible to come by. As such, it can be one significant feature of the presently disclosed systems and devices to provide this and other useful tournament information and features to players in a more ready and user friendly fashion. The implementation of these and other features and benefits for the provided systems and devices are described in greater detail below.

FIGS. 1A-1E illustrate in various views an exemplary electronic player terminal adapted for the play of individually paced table game tournaments according to one embodiment of the present disclosure. FIG. 1A is a top plan view, while FIGS. 1B through 1E are side, front, side and back elevation views respectively. As noted herein, electronic player terminal 100 can be linked to various different types of table games, and can be linked to multiple different tables, including simultaneously. Again, a player terminal can include any suitable EGM, and may include any platform capable of receiving and transmitting data, including "thin-client" platforms or platforms which do not process game play data and "smart" platforms or platforms which process game play data. A player terminal may be stationary, similar to the slot machines or electronic tables commonly seen at the physical casino, and/or may include various types of portable electronic devices such as smart phones, computer tablets, portable media players, laptop computers, desktop computers, smart TV, smart glasses, and the like.

Although a wide variety of possible layouts and arrangements can be applied to any given EGM or player terminal 100, a particular configuration is provided herein simply for purposes of illustration. As is generally shown in FIGS. 1A-1E, electronic player terminal 100 can include an outer housing 101 that may include a processor or controller (not shown) located therein. Numerous input and output components can be located at various locations about player terminal 100. One or more lights or lamps 110 can indicate various status by way of lit, unlit and color arrangements. An upper screen 120 and lower screen 130 can provide various displays to a player, as well as touchscreens that accept player input. Alternatively, or in addition, one or more buttons may also be provided for player inputs. Other components can include a ticket printer 140, bill acceptor 150, shelf 160, and one or more speakers 170. Gaming terminal 100 may also include power input 180, a locking mechanism 190 and one or more fans 192 or other cooling components. Of course, many other input and output components may also be provided at player terminal 100, as will be readily appreciated. Further, other configurations, arrangements, shapes and sizes for the player terminal may also be used.

Figure 1F:
FIG. 1F illustrates in front perspective view an exemplary alternative electronic player terminal adapted for the play of individually paced table game tournaments according to one embodiment of the present disclosure.

FIG. 1F illustrates in front perspective view an exemplary alternative electronic player terminal adapted for the play of individually paced table game tournaments according to one embodiment of the present disclosure. Electronic player terminal 199 can be functionally identical or similar to player terminal 100, while differing in overall appearance, such as in size, shape, color, display location, button and input locations, and the like.

Figure 2A:
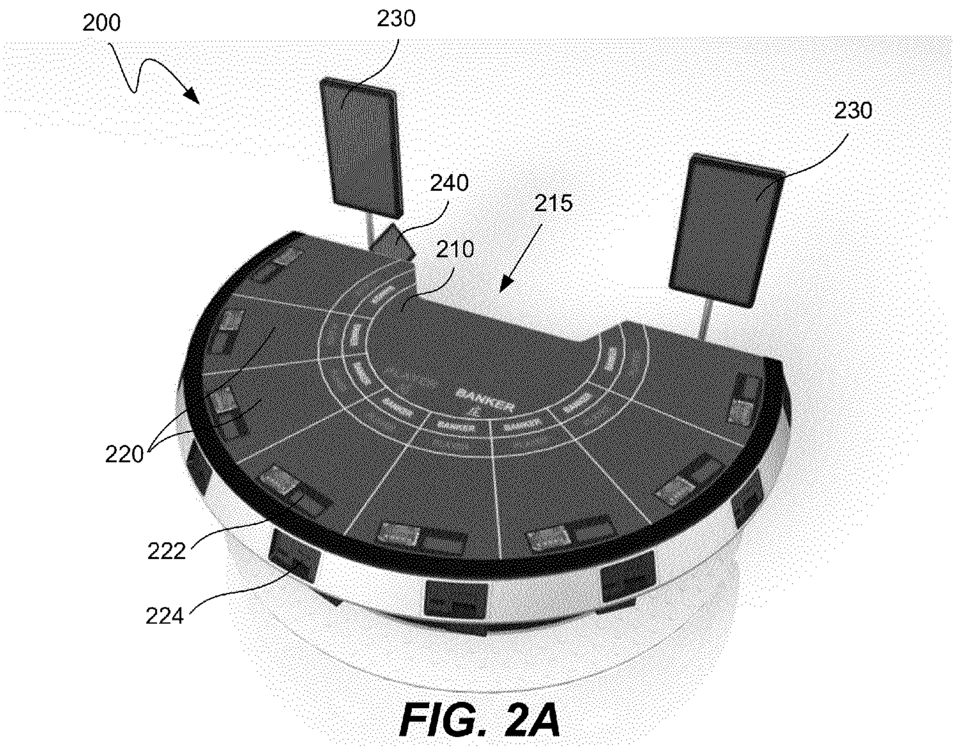
FIGS. 2A and 2B illustrate in top and front perspective views an exemplary electronic gaming table adapted for the play of individually paced table game tournaments according to one embodiment of the present disclosure.
Figure 2B:
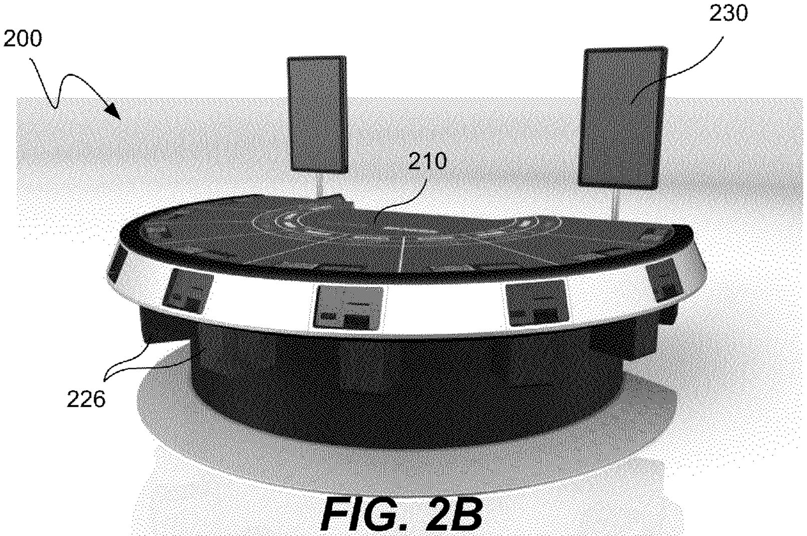

Referring next to FIGS. 2A and 2B, an exemplary electronic gaming table adapted for the play of individually paced game tournaments according to one embodiment of the present disclosure is illustrated in top and front perspective views respectively. It will be readily appreciated that this electronic gaming table ("eTable") 200 can also be provided in numerous other configurations and formats, such that the provided example is for illustrative purposes only. The eTable 200 can include a playing surface 210 adapted for the play of live table games using live physical components, a live dealer station or region 215, a plurality of optional player stations 220, each of which may have its own displays 222, bill acceptor, card acceptor and other input components 224, one or more community displays 230, and a dealer station display and/or computing device 240. One or more physical separators 226 may separate the different player stations 220. In some embodiments, eTable 200 might have no player stations, such that a dealer merely plays or administers a live game at a table with no players, whereby all player action occurs at remote gaming terminals, such as one or more of electronic player terminal 100 above and/or one or more portable devices, as set forth in greater detail below.

Each optional player position 220 around the eTable 200 can have a player terminal integrated into it. Like a standalone remote gaming terminal 100, each player terminal can have its own controller, buttons, touchscreen display, bill validator, printer, card reader, and so forth. The player terminals can be connected to a table controller ("TC") for the entire table via a switch/hub, and the TC connects to an overall local or wide area network, as provided in greater detail below.

Each eTable 200 can be hosted by a live human dealer, such as at a dealer station 215. The live human dealer can deal real cards and/or use real dice or other physical game components, which can be done on a wooden green-felt table surface 210, for example. Of course, other materials and/or colors may also be used. The cards can be drawn from an electronic shoe ("eShoe"), which is connected to the TC on the local table network. In some embodiments, the eShoe scans the cards and reads the rank and suits for each card removed. The TC, via player login data (such as player tracking card swipe or a cash insertion at the bill acceptor), knows which positions at the table are active and thus can monitor the progress of a game. One or more table sensors, such as a camera, RFID reader, or the like, can be used to capture video of the dealer action for broadcasting, as well as tracking of players and physical game components through a variety of means. The camera can also be used to further verify and keep a log of game activities, such as, for example, cards removed from the eShoe, cards dealt to player positions, bets entered, new players, and the like.

The eTable 200 can also have one or more displays. In one embodiment, there can be one or more community displays 230 to show common player information, such as community cards, table wager minimum, casino name, time, advertisement, and the like. Game history (e.g., baccarat roadmaps) may also be displayed on the same screen 230 or on a separate screen attached to or near the eTable 200. The eTable may also have discrete displays such as On/Off/Flashing lights mounted underneath table graphics to annunciate game information such as Banker Win, Player Win, New Game, No More Bets, and so forth. Such table screens and discrete displays can be driven by the TC.

Figure 3:
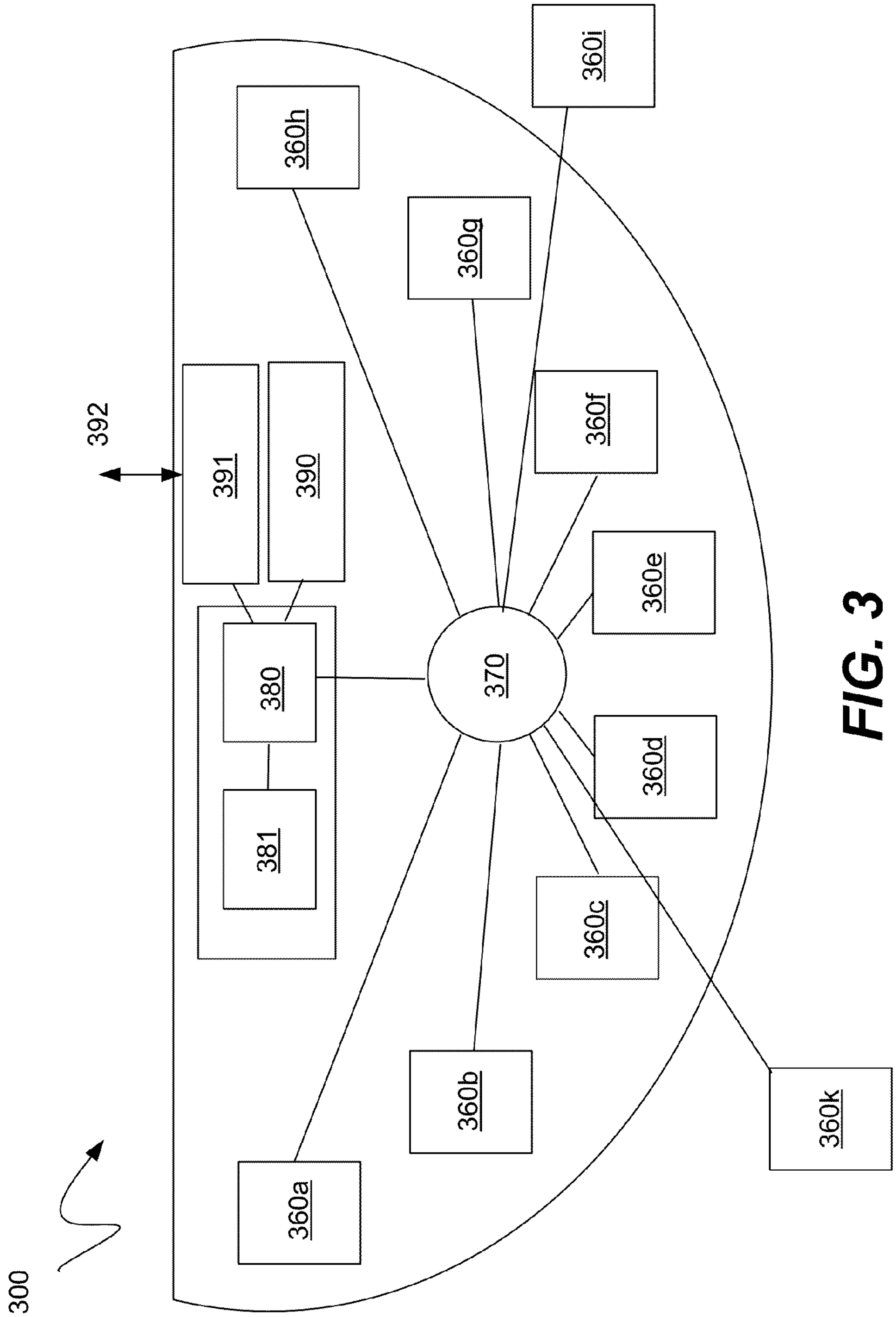
FIG. 3 illustrates in block diagram format an exemplary computing system for an electronic gaming table adapted for the play of individually paced table game tournaments according to one embodiment of the present disclosure.

Continuing with FIG. 3, an exemplary computing system for an electronic gaming table adapted for the play of individually paced table game tournaments is provided in block diagram format. Computing system 300 for an eTable can include various individual processors and peripherals 360*a*-360*k* for a plurality of player terminals or stations. In various embodiments, each of these separate items can be an identical or substantially similar set of processors, displays, inputs and other components, as may be desirable for each separate player station. As shown, some of the player stations (e.g., 360*a* through 360*h*) may be physically present at the eTable, while other player stations or terminals (e.g., 360*i* and 360*k*) may be located away from the eTable. Such remotely located player stations or terminals can be nearby the table and within view of the playing surface and or an overhead display of the playing surface. In addition, one or more remotely located player stations or terminals be located in a different room or different location entirely, such as where a video feed of the live table game can be provided to the player station for live play. Such remotely located player terminals can take the form of player terminal 100 above, and/or can be implemented on a third party user device, such as a smart phone, tablet, laptop, PDA, smart glasses, or the like.

All of the player station systems 360*a*-360*k* can couple to a central router or hub 370, which can be coupled to a master table controller ("TC") having a CPU 380 and memory or storage 381. The TC can be coupled to one or more table displays, as well as an interface 391 for outside communications. Such table display(s) 390 can provide views of the playing surface to many more players that may be nearby the table but not in position to have a good view of the playing surface. In this manner, dozens or hundreds of players can be playing at a single table. Link 392 represents the connection to the network, so that system 300 is able to communicate with various other outside network or system components.

In various embodiments, a remote game server can administer some or all of the game away from the actual physical table. The remote server can have the rules of the game, and can be responsible to conduct the table game, such that the TC only conducts data acquisition. As such, the TC can be connected to the card shoe, shuffler, camera(s), dealer terminal, chip counter, overhead display(s), and so forth. In operation, the TC can collect raw data from these peripherals and then provide this data to the host game server located remotely. The remote host or game server can then provide any number of functions, such as, for example, to process the game according to game rules, store the game states, keep track of game history, resolve player hands, credit or debit player accounts, run the community display, and the like. Data from each player terminal can be collected by the table controller or processor (i.e., TC) and forwarded to the remote server, can be sent to the remote server directly from player terminals, or some combination thereof.

In embodiments involving a remote game server, such a game server of the system may be adapted to handle multiple tables simultaneously. In such embodiments, the system can also broadcast games or action at multiple tables to each remote player terminal, thus allowing the player to watch other games and/or participate in more than one game at the same time.

In other embodiments, the TC itself can perform all of these functions during game play. In such embodiments, the eTable can be an isolated stand alone device, such as a single gaming machine or component. In some such arrangements, only final accounting results can then be forwarded to an overall casino or gaming system or other gaming network, as may be desired.

In various embodiments involving a remote server, a TC that runs most or all of the game functions, or both, the effective game controller can calculate the game results and then send such results to the live dealer for the final game decision. That is, the live dealer can be the final arbiter of the game results as provided by the appropriate game controller or processor. This redundant decision maker can assure a more robust game, as the dealer can correct game errors and make other actions before broadcasting any final game and payout results or resolutions.

In various embodiments, there may or may not be live players at the eTable. That is, in some embodiments the eTable may not have any live players sitting at the table, and rather has only the dealer, playing surface, cards and/or other live physical game components. In such embodiments, all live players may wager on and participate in the game action through remotely located game terminals. Again, such remotely located terminals may be nearby the eTable and within view of the playing surface and/or one or more community displays. For example, such nearby player terminals can be within 100 feet of the eTable. Of course, further distances and/or removed locations to other rooms or properties are also possible, such as where the remotely located players can view a video of the live game action.

Figure 4A:
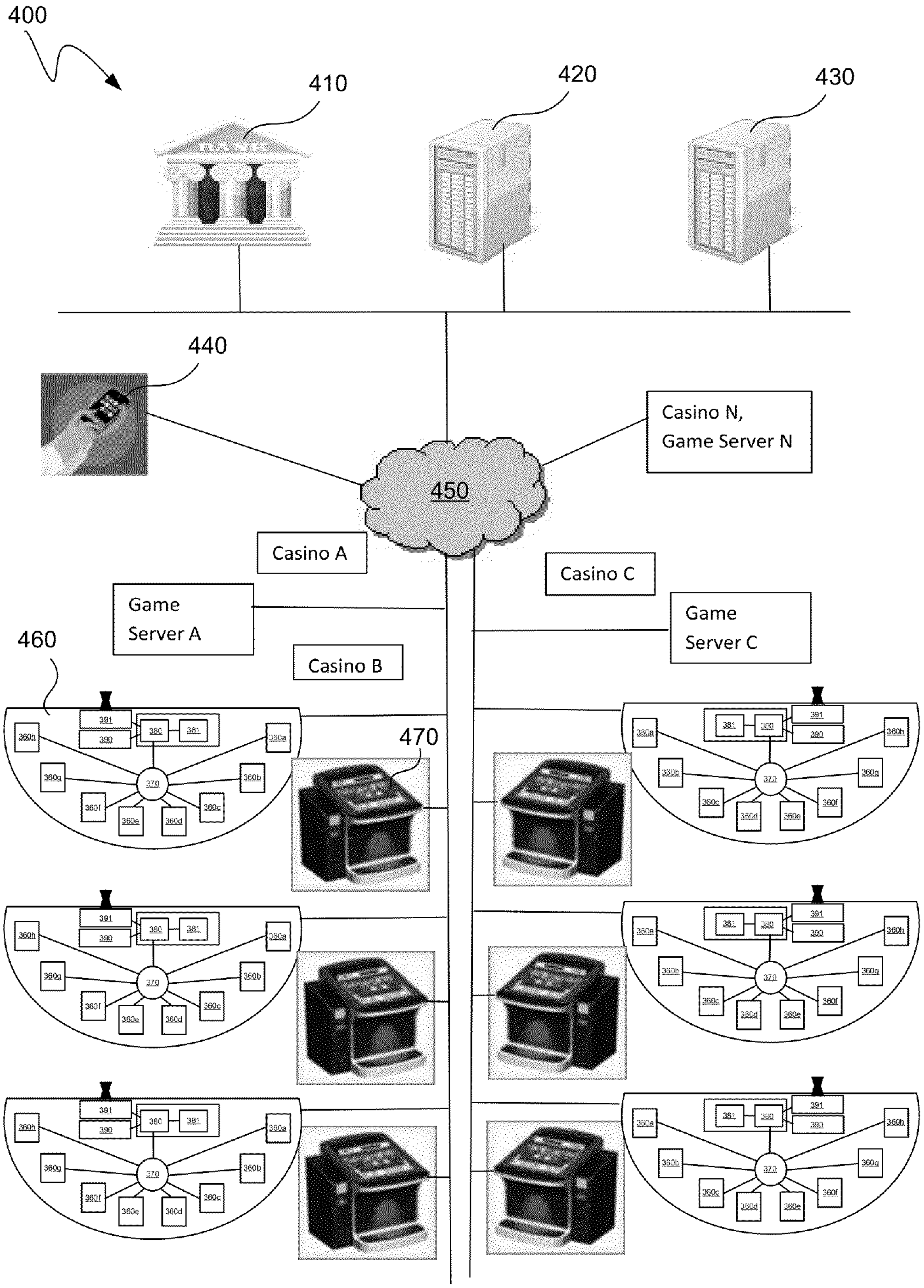
FIG. 4A illustrates in block diagram format an exemplary wide area electronic gaming system utilizing multiple player terminals, multiple electronic tables and various other system components across multiple locations according to one embodiment of the present disclosure.

Moving now to FIG. 4A, an exemplary electronic gaming system utilizing multiple player terminals, multiple electronic tables and various other system components across multiple locations is illustrated in block diagram format. Wide area system 400 can include a wide variety of components and items, such as a bank 410, a games router 420, and a financial clearinghouse 430. A cloud 450 or network can couple these items to various eTables, terminals, game servers, casinos, and other distributed components. One or more personal devices 440 can serve as remote player terminals in some embodiments. Various networked casinos, game servers, eTables 460 and other remote terminals 470 can also be coupled through the cloud 450 or network in wide area system 400. As will be readily appreciated, some or all of the remote terminals 470 in wide area system 400 can take the form of player terminal 100 set forth above, as well as any suitable variation thereof.

One or more game servers may be present in wide area system 400, and each operates in a particular manner to facilitate the play of the various table games set forth above. In such embodiments, a game server can collect live game information from each eTable, apply game rules, and return game results. Beside monitoring and controlling the games, the game server also keeps track, in a database, of game history of each eTable, accounting information, revenue reports, maintenance information, and the like. Each of these individual functions can be performed by a separate application on a separate server, or integrated into one application running on one comprehensive server. The determination of one or multiple servers and applications depends on the number of eTables, game stations, remote gaming terminals, both local and remote, that are being connected across the system.

Each separate casino or gaming establishment can have a singular or multiple game servers, and each game server can be configured to serve a particular game type (e.g., baccarat, blackjack, roulette, craps, and the like), a quantity of tables or game stations, or an area of the casino. In a multi-game, multi-site environment, one important function of the game server is the handling of financial transactions from remote game terminals. In some situations, remote game terminals can be logged into a particular eTable. From there, the remote player either participates directly as if he is sitting at the table, or back bets on one of the players at the table. In wide area system 401, however, a remote player need not be constrained to any particular physical eTable. For instance, a player sitting at a seat on a local eTable can wager on the game on going at the local table and at another table at the same casino, or at an eTable at a casino located elsewhere. These capabilities are enabled by a network of game servers, one or more games routers 420, and a central financial clearinghouse 430 for remote wagers.

Another function that can be performed by each game server across multiple establishments is the push of live game information to the game server to be broadcasted to remote gaming terminals. Here, the game server can reconstruct a live physical game in a number of ways, such as by mixing live video feeds of the game being played at the local eTable, the digital rendition of the game pieces (cards, dice, roulette wheel, etc.), the bet options (bet board), and the like, into a composite video stream and/or digital presentation for broadcasting. In short, the live game at the eTable can be broadcast to other gaming sites like TV channels being broadcast by cable TV system to eligible subscribers. Utilizing such a design, and in separating the game presentation from the bet actions, allows many remote devices to participate in a given live table game. Again, such devices can include a remote EGM, smart phone, tablet computer, laptop, smart TV, and the like.

A games router 420 can be a match maker between a given live eTable and a remote bettor or player. In operation, games router 420 receives search requests from the various remote game stations, matches up the search requests with the available live table games in its database, and directs the multitude of live game broadcasts to their requestors and subscribers. Again, such requests for remote play can come from remote EGMs, remote terminals, remote mobile devices, remote eTable players, and so forth. The games router 420 also monitors its subscriber-base for remote wagers from the subscribers. When a remote wager is received, the games router 420 verifies the eligibility of the wager prior to allowing the remote EGM to make a wager. Such verification can be based on EGM location, rules related to that location, player ID, funds available, and other relevant criteria. Once a remote wager is accepted at the eTable, the games router notifies the financial clearinghouse, which in turn handles the wager settlement based upon the game outcome. Then the local game server that services the remote EGM is notified, such that proper revenue accounting can take place, along with an audit trail for account reconciliations and/or dispute resolutions. Games router 420 can also handle notifications to remote players regarding wins, losses, account values, and the like.

Like the financial clearinghouse of a stock market, the financial clearinghouse ("FCH") 430 can be a centralized entity that keeps track of all of the remote wagers and all of the eTable(s) and remote terminals involved. At the end of each game at each eTable, the FCH 430 settles all accounts by crediting or debiting them. Such accounts can include each live player account, each remote player account, an overall eTable account, and any other pertinent account that requires resolution. FCH 430 receives remote bets from the games router 420 and the game results (e.g., win/loss, and paytable information) from the local games server for the particular eTable 460 involved in a given game. In one embodiment, a player account can be pre-established with the FCH 430, and the FCH can credit the player account directly at the casino where he or she is playing, or at his Bank 410, if that has been arranged. In another approach, the FCH 430 sends the settlement funds directly to the player station, EGM or remote terminal where the player is actually located. This can be a preferred approach for cash players, for example.

In various embodiments, remote gaming terminals 470 can be fully robust or even thin client gaming terminals that are allowed to participate in live games remotely from eTables in the overall system. As in the case of player stations at the eTables, the remote gaming terminals can be adapted to play in multiple live games, which can be done simultaneously and where the games are different from each other. A remote game terminal 470 can be similar to a video slot machine, with all the typical peripheral devices attached such as a coin or bill acceptor, display, player tracking card reader, printer, and the like. The main difference is that it is remotely located from the live table game, is connected to the eTable system network, and receives its live game feed from a game router.

A remote gaming terminal 470 may be provided as a kiosk, an interface at an electronic gaming device or eTable, a handheld device, cellular phone, tablet, laptop, PDA, smart TV, smart glasses or other suitable device networked (locally or via the Internet, for example) to the overall wide area system 400. Again, one or more remote gaming terminals 470 can take the form of a stationary and stand-alone player terminal 100 set forth above. A data communication device may be positioned at a gaming table and configured for receiving game play data randomly generated during play of the live table game, either through manual input or automatic input of game play information, such as the gaming symbols on the cards dealt, to the communication device. The communication device can be a PDA or smart phone 440, for example. Such a device can be at a live eTable, or can be a remote gaming terminal separate from all system eTables, similar to terminals 470.

In various embodiments, game play information may be manually input to data communication device through a manual input device such as a keypad or touchscreen. Alternatively, electronic scanning, recognition and detecting devices known in the art may be used to read cards, determine the location of a roulette ball, or ascertain the results of a dice game, and then automatically transmit the information via communication device. Game play information may also be automatically input using a camera mounted over the live table game to obtain game information, or through one or more card reading devices, such as an optical reader mounted in a gaming table, card delivery shoe, or card shuffler, which is capable of decoding the gaming symbols shown on physical playing cards. Alternatively, such as in electronic gaming platforms in which physical cards are replaced by virtual cards, the gaming data may derive from the random number generator used to generate random virtual cards.

The data communication device receives and transmits game play data, which can be live or randomly generated as a result of playing the live table game. A suitable processing device facilitates comparing the game play data with the rules and/or criteria for winning the wagers stored in data storage device, and determining an outcome of the wagers placed on the live table game via a data communication device of gaming terminal 470. If the criteria are satisfied, then the wager is won, whereas if the criteria are not satisfied the wager is lost. A display device at the gaming terminal 470 can be configured to facilitate the entry of wagers, show a live multimedia feed of the table game being played and communicate the outcome of any wagers placed.

As one example, wide area system 400 may be configured to provide the option for a player to enter remotely into a live conventional blackjack game through an eTable 460 or remote gaming terminal 470. A player using gaming terminal 470 may choose to participate in the live blackjack game or play another remote blackjack game in which the rules are different, such as the rules for dealing cards to reveal their value, or rules relating to the wager size (minimum, maximum, increment), or rules relating to payout associated with game symbols and symbol combinations, or rules allowing for a wild card, or in a blackjack variant in which the rules differ in any way from conventional blackjack. The cards dealt in the live game can be correlated by system 400 with the cards to be received in the remote wagering game according to its rules in order to resolve all wagers placed in the remote wagering game.

System 400 may be configured to be responsive to an additional request for randomly generated game play data, which may be necessary for resolving a remote wagering game played by a remote player. For example, system 400 may inform the dealer at the live table game through a communication device or display 140 to continue to deal a certain number of randomly shuffled cards above the amount needed to resolve the live table game, or system 400 may be in communication with a random number generator for the purpose of generating any amount of random gaming symbols necessary to match the amount necessary in the remote wagering game or add on to the random gaming symbols acquired from the live table game.

In another example, system 400 is configured to provide the option for a player to enter into a live conventional blackjack or play a remote blackjack game which includes one or more side wagers. Players may place the side wager through a player station at an eTable 460 or remote gaming terminal 470. Either live game component results and/or randomly generated gaming symbols received via a communication device can be compared via appropriate system processing, with criteria for determining the outcome of the side wager the determining whether the game outcome is favorable or negative. If favorable, then the side wager will be won and the player appropriately credited.

For example, a remote blackjack game may allow for the player to wager on receiving a hand that has achieved a poker rank such as a pair. The physically dealt cards and/or randomly generated gaming symbols dealt in the live conventional blackjack game are received and compared with the criteria that the gaming symbols corresponding to the player's hand in the remote blackjack game comprise two cards of the same rank. In yet another example, the game of baccarat may be played live and broadcast to player terminal 470, along with various remote baccarat variant games that include different rules, such as no-commission versions, variations on pay tables, or which include additional side wagers, which may include progressive side wagers, mystery jackpots or bonuses. Thus, players at a player station at an eTable 460 or remote gaming terminal 470 are capable of participating in many variations of baccarat games with the same hand delivered in the live table game.

Players may therefore have a variety of options to play other wagering games other than the live table game. However, system 400 may be configured so that only the remote wagering games that rely on the same amount or plurality of gaming symbols, or game variations that belong to the same game families (variations of baccarat, roulette, sic-bo, and the like) as those gaming symbols which are physically determined and/or randomly generated in the live table game are offered as available to players through the actual eTable.

System 400 may be configured to provide a simulation of the remote wagering game wager on by players using a player station or remote gaming terminal. The simulation may be presented on a suitable display according to the rules of the remote wagering game and may take any form, such as a display of playing cards being dealt by a virtual dealer or the actual dealer in the live table game, which would enhance the overall player experience. System 400 may be configured to provide a new display or skin on a display device of a station or gaming terminal and provide customized playing cards for the remote wagering games to distinguish between games and provide proprietary information, among other things. Variations in game rules, wager size and pay tables affecting payout amounts and volatility that are different from that of the live table may also be applied to the games at the remote game terminals to provide a favorable personalized player experience.

Figure 4B:
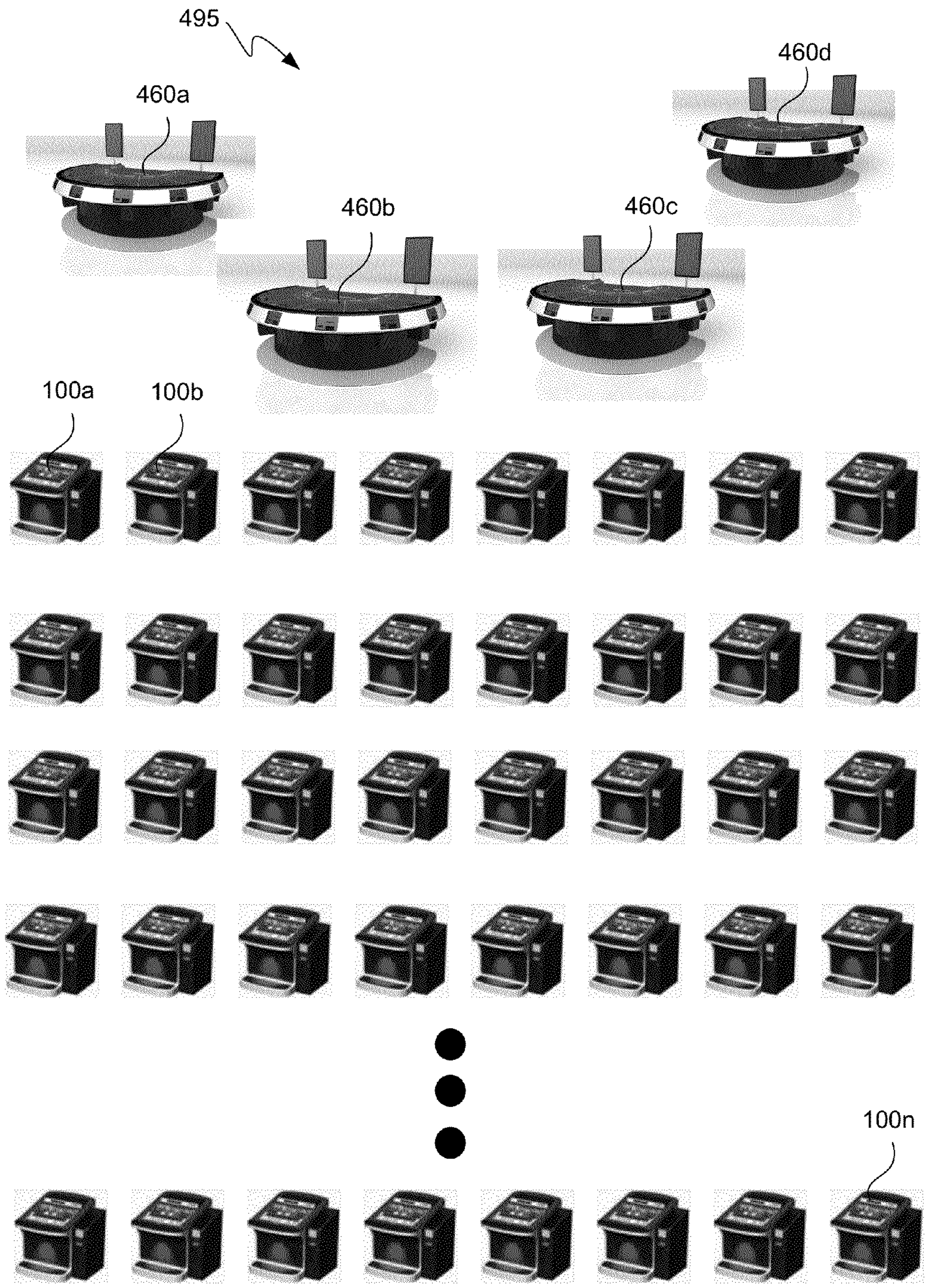
FIG. 4B illustrates in block diagram format an exemplary electronic gaming system utilizing numerous player terminals and one or more electronic tables such as those in FIGS. 1-3, albeit all in a single location, according to one embodiment of the present disclosure.

Moving next to FIG. 4B, a block diagram is provided for an exemplary electronic gaming system utilizing numerous player terminals and one or more electronic tables such as those in FIGS. 1-3, albeit all in a single location, such as on the floor of a casino or other gaming establishment. Localized gaming system 495 can include a plurality of eTables 460*a*, 460*b*, 460*c*, 460*d*, as well as numerous player terminals 100*a*-100*n* arranged in the vicinity of and in view of the eTables. As one example, each of about 100 player terminals 100*a*-100*n* can be coupled to each of the eTables 460*a*-460*d*. Although 4 electronic gaming tables and about 100 player terminals are shown, it will be readily appreciated that more or fewer of each component may be provided in a given localized gaming system set forth on a single casino floor or other location. In various embodiments, a player at a given electronic player terminal 100× may be provided the ability, such as by way of a button or other input, to switch between different gaming tables 460*a*-460*d*. Such a switch between different gaming tables may also occur with respect to different tables during the same gaming table tournament.

It will be understood that the foregoing player terminals, electronic gaming tables, remote servers and overall systems can be used in a variety of environments and for a variety of different applications and purposes, such as for the play of live table games of the cash variety. In addition to such standard applications, it is also specifically contemplated that these devices and systems be used with respect to table game tournaments. In particular, these devices and systems can be used to facilitate the hosting of individually paced table game tournaments, such as those that allow for asynchronous tournament play, easier access to tournament player data and stats, player abilities to switch tournament tables and/or play multiple tournament tables, and simultaneous tournament play and other live table game play, among other various features and options.

As in the case of many forms of table game tournaments, the casino, gaming establishment, or other hosting entity can organize and run a given table game tournament using the foregoing systems. As such, the tournament host can determine various tournament parameters, rules and other items, such as the game or games played, the buy in amounts, the length of the tournament, the number of rounds, the number of tables, the times of live table play, the scoring options, the minimum and/or maximum number of players, whether bonus or outside options can affect tournament scoring, and the prize or prizes, among other items.

An individually paced table game tournament as set forth herein is a table game tournament where players need not play live against each other or at the same time, at the same table(s), and/or at the same locations as each other. Players can play on their own timetables and at their own pace in order to play in the tournament and qualify for making the next round or winning the tournament or a tournament prize. Such tournaments can have play that is asynchronous, meaning that players can play at differing times when then want and can take breaks or off periods when they want without penalty. Such tournaments may or may not have a minimum number of hands, or alternatively and/or in addition a minimum amount of time spent playing in the tournament. While such minimums might not be required for some tournaments, it may be unlikely for players to advance to the next round or to win or finish in the money if they do not play at all and merely sit with their original stack of chips or buy in score.

While many traditional table game tournaments may require players to be present to play every hand or face a penalty (i.e., pay blinds, lose score, etc.), an individually paced table game tournament allows players to play at their own paces when they want and over multiple sessions. A player need not be present at the very start of the tournament, but may merely show up later to play his or her minimum amount of time or hands. For example, where 20 hands played are required for the first round of a tournament, a player may show up two hours after the official tournament start time and play 10 hands. The player may then go have a meal and return to play 5 more hands at a different player terminal and playing on a different eTable. The player may then decide to play another 10 hands the next day, which may take place at an entirely different location where the same tournament is also offered. The player may also elect to play more hands right at the end of the first round in an effort to catch up and make the next round, if desired.

As one overall tournament example, a gaming operator may elect to host a weeklong baccarat tournament. The tournament might start and end at noon on a Monday, and players are able to play at any time during the live week of play. There might be one live baccarat table with a dealer dedicated to tournament play during late night hours and other off periods of time, with two to four or more live baccarat tables with dealers dedicated to tournament play at other more lively hours or periods of time. There could be three rounds of play, such as two days, two days and three days, upon which players are eliminated or advance at the end of each round. Each player might be required to play a minimum of twenty baccarat hands with no maximum number during each round of play. Hands could be played at any time of choosing by a player, with tournament play taking place on one or more of the live dedicated tournament tables when played. Some hands or plays might take place while other tournament players are playing as well, while other plays might not do so. Chips or score is accumulated individually, upon which determinations can be made as to players being knocked out of the tournament, round advancement, and eventual prizes. Of course, other games, time limits, required minimum or limited maximum hands or time played, numbers of rounds, numbers of tables, numbers of players, buy in amounts, prizes, betting limits and so forth might be varied as desired by the gaming operator or host.

In various embodiments, players can register or sign up for a standard table game tournament or an individually paced table game tournament at any of a number of possible locations, such as at a player terminal, eTable, kiosk, personal handheld electronic device, specialized tournament registration terminal or desk, or other suitable location. Players can register for free or can buy in with cash or credit, depending on the tournament parameters and possible player status. In some embodiments, casino staff can enter player details, whereupon a personal identification number ("PIN") can be established or a random registration number can be generated, such as, for example, a unique 6-8 digit number. A receipt with the registration number can be printed and handed to the player. The player can also be given tournament times, table details, round details and other pertinent tournament information before and/or upon registration.

When a tournament begins or has already started, the player can press a tournament button or otherwise make a tournament selection as may be available on the player terminal, and then enter the PIN or other identifying number. If available, the player might also choose to swipe his or her player tracking card or some other form of player identification. Of course, other registration, login or buy in procedures might also be used. The system can then recognize the player and switch to "tournament mode" upon a proper number entry. The player will be able to play in the tournament for a number of games or time on one or more tournament tables using tournament credit, chips, score or the like. The player will be able to see on the scoreboard display whether he or she in the "top 10" or other elevated status of the tournament, as well as the balance of the top 10 players and their chip stack amounts or scores. At the end of a given tournament round, players can be told through display, celebration, or otherwise that they have moved onto the next round or have been knocked out of the tournament.

Players can be informed by information on the player terminal, on overhead displays, by casino staff, or other suitable ways as to when the next tournament round will begin, as well as information regarding the next round. Eligible players can thus continue in the tournament on one or more tournament tables until they make successive rounds and win or get knocked out. If there are multiple winners, then the casino or other hosting entity can run a playoff, such as a time based or hand based game with the time or number of remaining hands hidden from the players which can determine an overall winner.

In various embodiments, improved information regarding the tournament can be made available to the player at whatever location the player might be, whether it be at a gaming table, at a player terminal, or elsewhere. Such improved provisions of tournament information to players can take place for a variety of table games, tournament formats, and so forth, and can be for standard or individually paced table game tournaments. Such information can be provided, for example, on the player terminal display or displays, and can be given in automated fashion, according to one or more defaults set by a host, operator or player (e.g., information is updated automatically in intervals, such as 5 seconds, and/or when an event occurs to change information with respect to the last update), and/or on demand from the player. For example, a player might request by way of a button or other input a list of all current players that are in "star position" (i.e., currently in the money or set to go to the next round if no changes take place). Alternatively, or in addition, a player might request a determination of who is his or her "most serious opponent," along with a possible calculation of chip or score differences between the player and that opponent. Since all players, scores, hands, tables, terminals and the like are all tracked electronically across the system, such data is readily available and can be provided to the player instantly on demand.

These informational items and other data and information can be quite useful to an intelligent tournament player, such as in helping the player to form a more appropriate strategy for the remainder of the tournament. Such other information that can be provided and updated in automated fashion and/or on demand might include, for example, the position of the player with respect to the chip or score leaders, or all other players in the tournament, which other players are currently active, what amounts those players are betting, what table(s) those players are playing, how many hands, plays or time is left in a given round, what the current prizes are and who would qualify for them at the moment, whether the player is in star position or not, which players have bought in and which are comp'ed or otherwise benefited in for less than a full buy in, whether multiple tournament tables can simultaneously be played and how, whether live cash games can simultaneously be played with the tournament tables and how, which other tournament tables are live and available, whether there is a dealer change at a table, a deck change at a table, a new card shuffle at a table, and so forth. Still additional information can include, for example, the tournament name and statistical information, the minimum and maximum bets for a hand or play, the player score, the score for tournament leaders and other players, the player position in the tournament (e.g., 37 out of 100), live video feeds of table game play and/or other tournament players that are currently playing, and other possible items.

In some tournaments, tournament chips or score might only be accumulated by way of straight tournament play. Alternatively, some component of a player tourney score might be by way of bonus play, re-buys, or other inputs. For example, a player who plays a certain amount or type of live games may receive some bonus credit or "re-buy" value for his or her tournament chip stack or score. Information regarding this added component to tournament chips or score might also be made readily available to players upon request, such as at a player terminal.

Other displays, indicators and/or statuses can also be used with respect to tournament play as opposed to regular or cash game play. That is, each of the player terminals 100 is preferably configured to be able to play both live cash games and also to play tournament games. In some embodiments, a player terminal can allow a player to play multiple games at multiple tables simultaneously. This can include where a tournament game or hand is being played at the same time as a cash game or hand (i.e., a regular non-tournament game). In addition, multiple tournament tables can be played at the same time, if available. In the event that a tournament game is being played, one or more special buttons, lights, screen modes, background displays or theme changes, bezels or indicators can be provided so that the player is aware that at least one tournament mode is being played at the player terminal. Such indicators might also provide notice to nearby players or people that a given terminal is being used in tournament mode.

In various embodiments, it can be possible for a given eTable to be providing a live table game that can be wagered on as a live game and can also be used as a tournament game for those in the tournament. In such instances, the table dealer need not be aware of which modes are being used or not used, and game play can proceed as if the game were simply a live cash game. Non-tournament players can play standard cash games on the table without being affected by the tournament. The overall system can distinguish whether a given player is eligible to play in an appropriate tournament, and as such those options can be provided to the player at the player terminal. For example, where a player is playing in a tournament, a player terminal, upon noting a sign on of that player, can offer live games, tournament games or both. Whichever mode the player chooses, such games can still take place on the same live eTable or eTables. In some embodiments, a player can play a given table game in both tournament mode and live cash mode at the same time. In yet another embodiment, a player participating in a live game can, using his or her live game results, simultaneously participate in multiple tournaments taking place at different locations, times, or the like. Of course, different tournament rules may be followed where applicable, and separate wagers may be required for each different tournament and/or mode, such as a live cash wager along with a wager of a portion of the player chips or score for the tournament mode play.

Again, a tournament player can elect to switch from one table to another table while still playing in the tournament. In some embodiments, this table selection or switch can be made quickly and readily at the player terminal, and a switch need not slow down the player or affect tournament play or speed. Such an option can be quite appealing to many players who like to switch tables as a way of changing their luck during a bad streak. For example, where there might be 4 possible tournament tables at a given time, a player might login for resuming his or her tournament session and elect table 2 to play on. After some time, the player may decide to switch over to playing on table 3, which can be done instantly upon the proper button or input selection by the player. After some further time, the player may decide to add table 1 and play both table 1 and table 3 in tournament mode at the same time. Other suitable examples and configurations are also possible, of course.

When a tournament player has completed the required amount of time and/or number of hands or plays to qualify for a given round, the player can be informed that they have made it to the next round or have been knocked out. If the overall time limit for the round is not finished, then an indication of whether the player is currently in star position or not may be provided. Further, a player can be provided with a display item as to how much time or how many hands are remaining to meet the minimum qualification for a given round. A running tally of player score, as well as overall time and/or hands or plays played can be provided once the player does pass or exceed any applicable minimums.

In some embodiments, an alert or other message can be provided to a player if the minimum has not been met and the end of a round is approaching. Such a message or alert can be on the player terminal that a player currently uses, can be by way of a community display, an e-mail, text message or phone call, or can be by a notification by casino or other host operator personnel. Such a courtesy warning can prompt a player to complete the minimum time or hands required for a tournament round, so as not to be disqualified for that reason. For example, where a one week tournament round requires that 50 hands of blackjack be played in tournament mode, a player who has played only 45 hands might receive an automated warning that 5 more tournament hand plays are needed. Such a warning might be provided a day, an hour, and/or several minutes before the round officially ends, among other possible times.

In some embodiments, a tournament may be a combination of individually paced play along with a live component of play. For example, the first few rounds of a given table game tournament can be self-paced and asynchronous in fashion, as set forth above. For the final table, however, a set time can be established for the final qualifying players to show up in person to finish the tournament live. Such a final table might also require live table play, rather than terminal or remote terminal play.

As noted above, a wide variety of devices can be used as a player terminal in conjunction with the disclosed embodiments. In various embodiments, such player terminals can be a portable electronic device, such as smart phone 440 above. Other possible devices can include computer tablets, portable media players, laptop computers, smart glasses, and/or other portable electronic devices, as well as desktop computers, smart TVs, and the like. Such devices, and in particular such portable devices, can be owned and checked out or leased by the host establishment, and/or can be owned by third parties, such as the players themselves. For example, various player terminals can include player owned smart phones, tablets, and PDAs, such as iPhones, Android phones, Windows phones, iPads, and various other tablets, laptops and other devices.

In various embodiments, such electronic devices can be provided with specialized or proprietary software, such as an application ("app"), program, patch, upgrade, or the like. Such a program might be made available through an "app store" or similar provider, as will be readily appreciated, and can be adapted to make the third party device function similarly to a host owned or operated player terminal. A third party owner or user of a device could be required to agree to terms of using the app or other software program on his or her device, whereupon various security measures and safeguards could be implemented by the app or program maker and provider. Upon download and installation, a user can be permitted to play on his or her phone or other device both near the gaming tables and/or from remote locations, in a manner similar to that of other player terminals.

In various embodiments, such smart phones and other electronic devices can be active player terminals that allow players to play in actual live table games, which can include cash games and/or tournament games, as will be readily appreciated. In various embodiments, which can be alternative to or can include the foregoing embodiments, such smart phones and other devices can be used as practice play or "play along" devices where players are allowed to participate in actual table games without having to buy in, purchase chips, or otherwise invest actual money or credit. In such embodiments, a mobile device or other suitable player terminal can function just as if it were an actual player terminal in live cash and/or tournament table games, only with a practice or imaginary stake or amount, rather than a live cash or monetary credit.

Although it is possible to allow all player terminals or stations to work and function in such a practice or "play along" mode, it is likely that some gaming establishments may desire to give preferential treatment to live cash players over practice players, such as in the case of actual table seats or operator owned terminals like player terminal 100. Where such play along modes are allowed for such player stations or terminals, a time limit or requirement to leave in favor of an actual game player might be imposed by a given establishment. In contrast, it can be less onerous for a prospective player to practice or play along in a pretend money or credit mode when he or she is using his or her own third party device. As such, it may become more popular to implement such play along or practice modes on user devices.

In some situations, a player can elect to install an app or other suitable software to his or her personally owned smart phone or other device, with suitable security measures, safeguards and agreements in place regarding use of the software. The software could allow the user device to function as a player terminal that allows the player to participate in live cash table games and/or table game tournaments, in regular play mode, in practice play along mode, or both. The third party devices could function as a player terminal in any or all ways noted above and otherwise, such as to allow player buy-in or registration, to provide players with live video feeds and other tournament information, to allow game play input and present game results, to give alerts, to present awards and credit player accounts, and so forth.

The player could then use his or her device with the specialized software installed thereupon to login to the table game system, and also sign up for a suitable table game tournament, either by buying in or otherwise presenting a suitable entry credit, or by playing along in practice mode. This could be done from any location. Regardless of whether actual or practice mode is selected, and regardless of whether or not any third party devices are used as player terminals, the table game tournament can be run as in the foregoing examples. In the event of a practice or play along mode being selected by the player, a running score could be kept for the player to apprise him or her of their progress as if they were an actual player. In various embodiments, this score would not factor in the actual game prizes to be awarded to the real game players, but would give the player experience and present the player with information as to how he or she would have fared if he or she had actually been playing in the tournament with a real buyin, money or other credit. Some embodiments might include practice or play along scores being broadcast or otherwise provided to real and/or practice players, while some embodiments might exclude such information and only focus on actual player scores or results.

In this manner, prospective players can be permitted to familiarize themselves with the rules, procedure, pace and other factors inherent to playing in a table game tournament without needing to spend real money on buy ins or otherwise expose themselves to uncomfortable or unfamiliar situations. Such non-threatening access to playing or practice playing along with actual table game tournaments can serve to promote these items and generate more interest amongst prospective players who might otherwise be intimidated by or shy away from a real live tournament.

As in the foregoing embodiments, some or all features that may be present for actual live players can be made available to play along players and/or live players using a third party device as a player terminal. For example, the system can be adapted to provide useful information about the tournament to the player on his or her smart phone or other device. Such information can include, for example, a listing of players or player scores that are currently in "star positions" or are otherwise set to advance at the end of a tournament round, a determination of the most serious opponent to the player, as well as the score or chips held by the most serious opponent, the difference in score or chips between the player and the most serious opponent, or both, among other possible informational items. In this manner, a prospective player using a play along mode can participate more robustly as if he or she were actually playing in the tournament. Continued practice and familiarization on the personal mobile device of a user can then generate more interest in players that might not otherwise participate or who might play in tournaments less than before.

Figure 5:
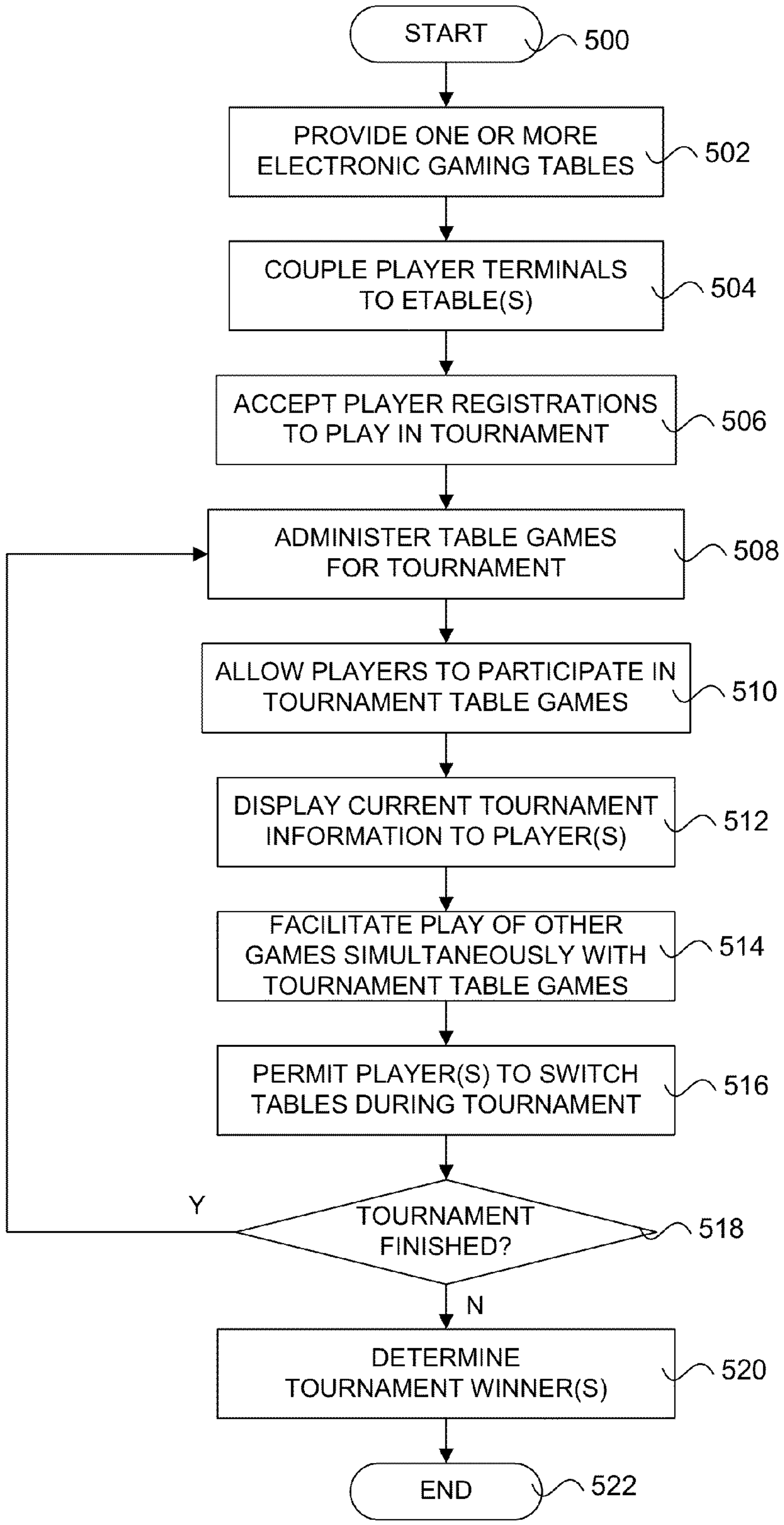
FIG. 5 provides a flowchart of an exemplary method of hosting an individually paced table game tournament according to one embodiment of the present disclosure.
Figure 6:
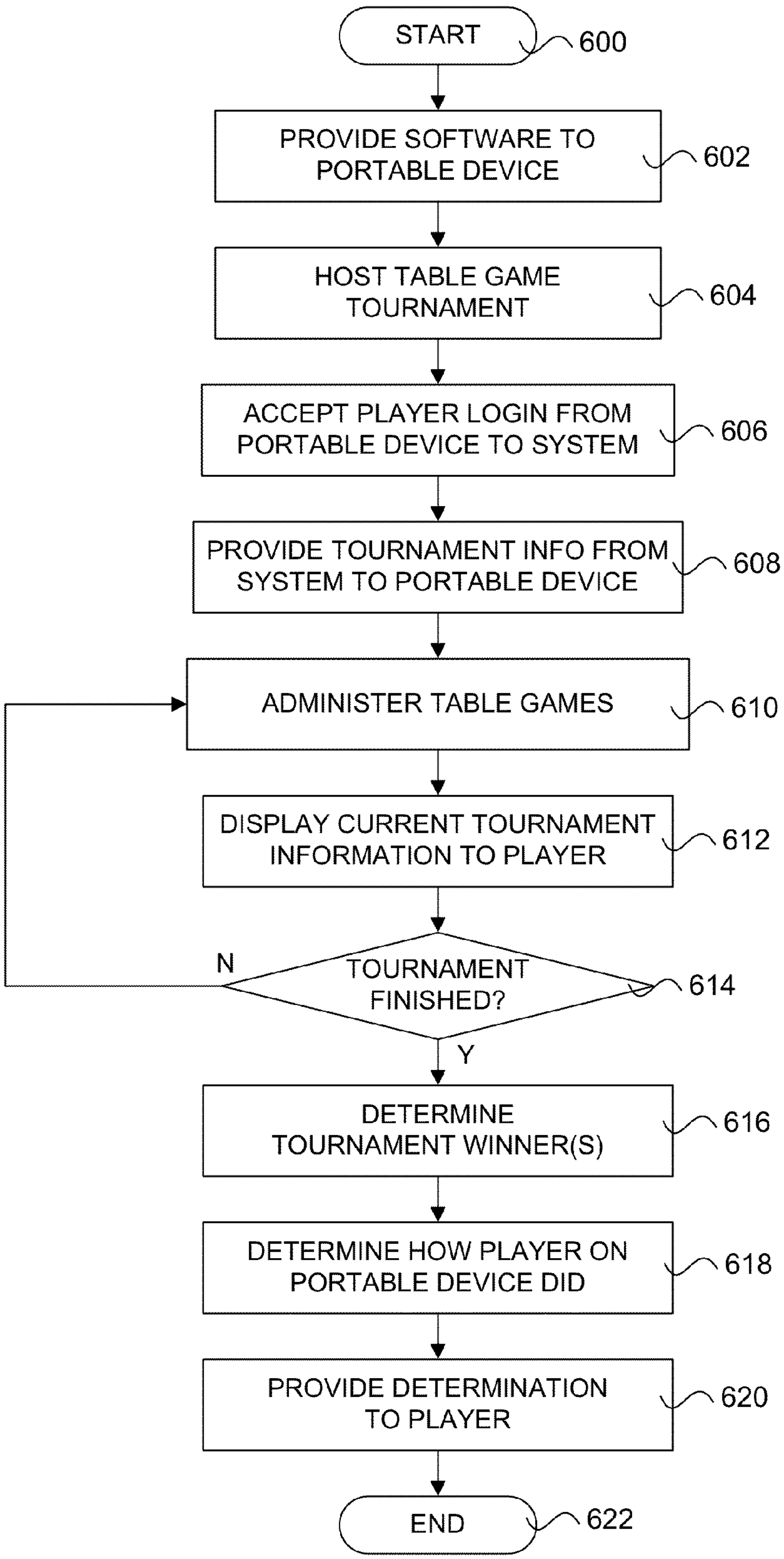
FIG. 6 provides a flowchart of an exemplary method of facilitating player participation in a table game tournament using a portable computing device according to one embodiment of the present disclosure.

Turning now to FIGS. 5 and 6, various methods concerning individually paced table game tournaments are provided. FIG. 5 is a flowchart of an exemplary method of hosting an individually paced table game tournament. After a start step 500, one or more electronic gaming tables, or eTables, are provided at process step 502. Such eTables can be those that are set forth above, for example. A plurality of player terminals are then coupled to one or more of the eTables at process step 504. Again, such player terminals can be at a player station at an eTable or EGM, at a remote terminal, or at any remote playing device, as will be readily appreciated. At a next process step 506, registrations are accepted from a plurality of players to play in the tournament. Such registrations can include buy-ins, logins, comp vouchers, or other ways for players to become part of the overall table game tournament.

At subsequent process step 508, a plurality of individual tournament table games are administered at each of the one or more electronic gaming tables over the course of the tournament. While this step takes place, the plurality of players are allowed to participate in the plurality of administered table games at process step 510, which can be in parallel with process step 508. The participation of the players can take place according to the choices of each player, such that overall tournament play is asynchronous. That is, players are not required to play in every individual table game and players are not required to play concurrently with other players, as noted above and including several examples.

At another process step 512, current tournament information can be displayed to a player. This can take place upon a demand from the player, can be automated (e.g., updates at 5 second intervals and/or when an event occurs that changes information from the last update), and/or can be continuous. Step 512 can also take place in parallel with, before or after process step 508. Again, such current tournament information can include a determination of the most serious opponent to the player, as well as the score or chips held by the most serious opponent, the difference in score or chips between the player and the most serious opponent, or both. Other tournament information could also be displayed, as set forth above. Optional process step 514 involves facilitating the play of other table games simultaneously with the play of the individually paced table game tournament. This step 514 can also take place in parallel with, before or after process step 508. Another optional process step 516 can involve permitting a player to switch tables. That is, a player can switch his or her table on demand from tournament table games taking place on a first electronic gaming table to a second electronic gaming table. This step can also take place during the overall administration of table games step 508.

At a following decision step 518, an inquiry is made as to whether more time is left in the tournament such that more hands or plays are to take place. If so, then the method reverts to process step 508 and steps 508-518 are repeated. If not, then the method continues to process step 520, where one or more winners at the end of the tournament are determined according to the outcomes of all of the tournament table games. For example, the overall player chips stacks or scores can be used to determine the tournament winner and any other players that might finish "in the money." The method then ends at end step 522.

Moving lastly to FIG. 6, a flowchart of an exemplary method of facilitating player participation in a table game tournament using a portable computing device is provided. Such a table game tournament can be an individually paced tournament, such as that which is set forth above. After a start step 600, a suitable software application ("app"), component, update, patch, or the like is provided from a host system to a portable computing device at a process step 602. The portable computing device can be owned and operated by the tournament host, or can be a third party device, such as one that is owned by the player. Such a software component can be one that allows the third party or other mobile device to act like a remote terminal for purposes of playing table games, such as for an individually paced table game tournament. In various embodiments, the software application is provided by the tournament host or other trusted provider, and the third party user can be bound by a user agreement with respect to installing the program on his or her device. In addition, some level of security, encryption, and the like can be implemented as part of the program, such that communications from the third party device can be readily trusted to be from the appropriate program in an undisturbed capacity.

At a following process step 604, a suitable table game tournament is hosted by the tournament host or provider. As in the foregoing embodiments, such a table game tournament can involve the use of various player terminals, eTables, and associated components such as those that are set forth above, for example. Such a tournament can be one that runs regardless of whether any third party devices are enabled as actual or practice player terminals, and can be in the form of an individually paced table game tournament, for example. As such, play can be asynchronous and can stretch over a number of hours, days, weeks or months.

At a next process step 606, a player login from a third party or other computing device is accepted by the system. Again, such a device can be a smart phone, tablet, PDA, laptop, desktop computer, smart glasses, or any other suitable device. The device can be one that has an appropriate app or other software downloaded an installed thereupon, such as in step 602. Upon login, the device can be located at virtually any place, such as near one or more active eTables, elsewhere within the hosting casino or establishment, or at a remote location. This login can be done to facilitate regular play in the tournament, or can allow a prospective player to follow along with the tournament, such as in a "practice play" mode. At a following process step 608, tournament specific information in order to initiate tournament play can be provided from the system to the third party device. Such information can include, for example, game type, length of tournament and applicable playing times, number of rounds, length of rounds, minimum hand or play amounts, betting limits, prizes, other players, and so forth.

At subsequent process step 610, a plurality of individual tournament table games are administered at each of the one or more electronic gaming tables over the course of the tournament. As in the foregoing embodiment, the player using the third party or other device can be allowed to participate in the plurality of administered table games over the length of the tournament. Again, such participation can be active and real play within the tournament, or can be in the form of a play along or practice mode to see how the player would fare if he or she were an actual player in the tournament. As in the foregoing embodiment, such play can take place according to the choices of the player in asynchronous fashion, such that the player is not required to play in every individual table game and is not required to play concurrently or in the same locations with other players.

At another process step 612, current tournament information can be displayed to a player on his or her third party computing device. Similar to the foregoing embodiment, this can take place upon a demand from the player, can be automated (e.g., updates at 5 second intervals and/or when an event occurs that changes information from the last update), and/or can be continuous. Again, such current tournament information can include a determination of the most serious opponent to the player, as well as the score or chips held by the most serious opponent, the difference in score or chips between the player and the most serious opponent, or both, among other possible informational items.

At a following decision step 614, an inquiry is made as to whether more time is left in the tournament such that more hands or plays are to take place. If so, then the method reverts to process step 610 and steps 610 and 612 are repeated. If not, then the method continues to process step 616. Similar to the foregoing embodiment above, process step 616 can involve where one or more winners at the end of the tournament are determined according to the outcomes of all of the tournament table games. For example, the overall player chips stacks or scores can be used to determine the tournament winner and any other players that might finish "in the money."

At a subsequent process step 618, a determination is made as to how the player on the third party computing device performed during the tournament, and this determination is then provided to the player at process step 620. This can involve actual results where the player did buy in and participate in the tournament. Where the player alternatively played in "play along" or practice mode, however, the player can be apprised as to how he or she "would have" fared had he or she been an actual participant in the tournament. For example, the system could determine that the player played well enough to have a chip count or score higher than all actual players, whereupon the system would notify the third party device user that he or she would have won the tournament had he or she actually participated. As another example, the system could inform the player that he or she would have been eliminated during the first round if that were actually the case due to player decisions made during the play along session. Other information, statuses, advice, or help may also be provided to a player that used such a practice mode. The method then ends at end step 622.

As in the foregoing embodiment, optional process steps not included here could involve facilitating the play of other table games simultaneously with the play of the individually paced table game tournament, and/or permitting a player to switch tables. Further, such steps, and others, could take place in parallel or in different orders than that which is set forth herein, as will be readily appreciated. Also, the device functioning as a player terminal can be a third party device, such as that which is owned by the player or associate, or can be a device that is owned or operated by the casino or other host establishment. Such a device can be a portable device, or any other suitable electronic device.

For both of the foregoing flowcharts and methods, it will be readily appreciated that not every method step provided is always necessary, and that further steps not set forth herein may also be included. For example, added steps to involve additional player stations or eTables, or to set minimum and/or maximum playing times or hands for the tournament, as well as overall length of the tournament or number of rounds may be added. Furthermore, the exact order of steps may be altered as desired, and some steps may be performed simultaneously. In addition, while the provided examples are with respect to baccarat, it will be readily understood that other casino and wagering games can be similarly adapted to provide individually paced table game tournaments in a similar manner.

It should be understood that the devices, systems and methods described herein may be adapted and configured to function independently or may also interact with other systems or applications, such as for example, a casino management system or player tracking system. As such, the wagering data may be recorded and stored in connection with player information retrieved from the terminal. It should also be readily apparent that additional computerized or manual systems may also be employed in accordance with the disclosure in order to achieve its full implementation as a system, apparatus or method.

Those skilled in the art will readily appreciate that any of the systems and methods of the disclosure may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as an existing electronic gaming machine, portable computing device or electronic platforms with multiple player positions. In addition, the system of the disclosure may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the disclosure so long as players and operators thereof are provided with useful access thereto or the opportunity to play the game as described herein.

The various aspects, embodiments, implementations or features of the described embodiments can be used separately or in any combination. Various aspects of the described embodiments can be implemented by software, hardware or a combination of hardware and software. Computer readable medium can be any data storage device that can store data which can thereafter be read by a computer system. Examples of computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A gaming table system, comprising:

(a) one or more electronic gaming tables configured to conduct tournament table games involving wager based games, wherein each of said one or more electronic gaming tables includes:

a physical surface configured for the play of a table game that includes a live dealer and the use of one or more physical game components, a table controller configured to control a plurality of gaming table functions, wherein said table controller is further configured to facilitate the provision of current tournament information upon demand, continuously in automated fashion, or both, and a table communication interface coupled to the table controller and configured to facilitate communications between the table controller and other electronic components within the tournament table gaming system; and (b) a system server located remotely from and in communication with the one or more electronic gaming tables, said system server being configured to facilitate the play of tournament table games administered at said one or more electronic gaming tables by players who are located remotely from the one or more electronic gaming tables and who are using a plurality of separate portable electronic devices configured to function as player terminals; and wherein said system is configured to permit player participation in a practice mode for an actual table game tournament that takes place on one or more electronic gaming tables that include a live dealer and the use of one or more physical game components.

2. The gaming table system of claim 1, wherein said player participation in a practice mode takes place on one or more of the plurality of portable electronic devices.

3. The gaming table system of claim 1, wherein said practice mode provides a player score as if a practice player were actually playing in the tournament.

4. The gaming table system of claim 1, wherein said practice mode provides all tournament player terminal features to a practice player as if the practice player were actually playing in the tournament.

5. The gaming table system of claim 1, wherein said practice mode provides information to a practice player regarding how he or she would have fared if he or she had actually been playing in the tournament.

6. The gaming table system of claim 1, wherein said system is adapted to facilitate on one or more of the plurality of portable electronic devices the play of other table games simultaneously with the play of the table game tournament.

7. The gaming table system of claim 1, wherein said system is adapted to permit a player using one of the plurality of portable electronic devices to switch tournament play on demand from table games taking place on a first electronic gaming table to a second electronic gaming table.

8. The gaming table system of claim 1, wherein said system is adapted to permit a player using one of the plurality of portable electronic devices to play in the table game tournament asynchronously with respect to other players also playing in the table game tournament.

9. The gaming table system of claim 1, wherein at least one of the plurality of portable electronic devices is a smart phone owned by the player using the device.

10. A gaming table configured to host a table game tournament involving wager based table games and one or more awards, the tournament gaming table comprising:

a physical surface configured for the play of a table game tournament that includes the use of a live dealer and one or more physical game components;

a table controller configured to control a plurality of gaming table functions, wherein said table controller is further configured to facilitate the provision of current tournament information to a player who is located remotely from the gaming table and who is using a portable electronic device configured to function as a player terminal, and wherein said table controller is further configured to facilitate player participation in a practice mode for an actual table game tournament that takes place on the gaming table having a live dealer and the user of one or more physical game components; and a communication interface coupled to the table controller and configured to facilitate communications between the table controller and an outside gaming network, wherein the outside gaming network includes at least one or more similar gaming tables that host table games for the table game tournament, a remotely located system server, or both.

11. The gaming table of claim 10, wherein said practice mode provides all tournament features to a practice player as if the practice player were actually playing in the tournament.

12. The gaming table of claim 10, wherein said practice mode provides information to a practice player regarding how he or she would have fared if he or she had actually been playing in the tournament.

13. The gaming table of claim 10, wherein said table is adapted to facilitate play in the table game tournament asynchronously with respect to other players also playing in the table game tournament.

14. The gaming table of claim 10, wherein the portable electronic device is a smart phone owned by the player using the device.

15. A method of facilitating player participation in a table game tournament using a portable computing device, the method comprising:

providing a specialized software component to a portable computing device, the specialized software component being configured to permit the portable computing device to function as a player terminal for a table game tournament that takes place at one or more physical gaming tables;

accepting a login from a player using the portable computing device, wherein the player is located remotely from all of the one or more physical gaming tables;

providing information specific to the table game tournament to the portable computing device;

administering a plurality of table games for the table game tournament on the one or more physical gaming tables, wherein the plurality of table games include a live dealer and the use of one or more physical game components; and permitting the player to participate in the plurality of table games for the table game tournament using the portable computing device, and while remaining remotely located from all of the one or more physical gaming tables; and wherein said player participation takes place in a practice mode for the actual game tournament that takes place on the one or more physical gaming tables that include a live dealer and the use of one or more physical game components.

16. The method of claim 15, wherein overall tournament play is asynchronous such that the player is permitted to play at his or her own pace and is not required to play in every individual table game and is not required to play concurrently with other players.

17. The method of claim 15, further including the steps of:

determining how the player in practice mode performed during the tournament; and providing this determination to the player.

* * * * *